United States Patent
Shauber

(10) Patent No.: US 6,228,819 B1
(45) Date of Patent: May 8, 2001

(54) PROCESS FOR MAKING A VISCOSITY INDEX IMPROVING COPOLYMER

(75) Inventor: Claude Charles Shauber, Riedseltz (FR)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 08/230,582

(22) Filed: Apr. 14, 1994

(51) Int. Cl.⁷ .................. C10M 145/14; C08F 2/00; C08F 220/12
(52) U.S. Cl. ................. 508/472; 526/79; 526/329.2
(58) Field of Search ............... 252/56 R; 526/79, 526/329.2; 508/472

(56) References Cited

U.S. PATENT DOCUMENTS

| | | | |
|---|---|---|---|
| 3,642,633 | 2/1972 | Eckert et al. | 252/57 |
| 3,816,315 | 6/1974 | Morduchowitz et al. | 252/51.5 A |
| 4,496,691 * | 1/1985 | Proux et al. | 252/56 R |
| 4,756,843 | 7/1988 | Jarrin et al. | 252/56 R |
| 4,933,400 * | 6/1990 | Jarvis et al. | 526/329.2 |
| 4,968,444 | 11/1990 | Knoell et al. | 252/56 R |
| 5,368,761 * | 11/1994 | Gore et al. | 252/56 R |
| 5,371,149 * | 12/1994 | Kishida et al. | 252/56 R |
| 5,401,800 * | 3/1995 | Hoshino et al. | 526/329.2 |

FOREIGN PATENT DOCUMENTS

| | | | |
|---|---|---|---|
| 2006420 | 12/1989 | (CA) . | |
| 1189281 | 4/1970 | (EP) . | |
| 540939 | 5/1993 | (EP) . | |
| 20715 | 9/1976 | (JP) . | C10M/1/28 |
| 59-020715 | 5/1984 | (JP) . | |

* cited by examiner

*Primary Examiner*—Jerry D. Johnson
(74) *Attorney, Agent, or Firm*—Oblon, Spivak, McClelland, Maier & Neustadt, P.C.

(57) ABSTRACT

A method for making viscosity index improving copolymer includes polymerizing a monomer mixture including a first (meth)acrylate monomer, a second (meth)acrylate monomer and a styrenic monomer in an oil soluble diluent and in the presence of a polymerization initiator to form a polymerization intermediate and then polymerizing an additional amount of the first (meth)acrylate monomer, the second (meth)acrylate monomer or a mixture thereof in the presence of the polymerization intermediate to provide a solution of a viscosity index improving copolymer in the diluent wherein the solution includes less than or equal to 1000 parts by weight residual styrene monomer per one million parts by weight solution.

5 Claims, No Drawings

PROCESS FOR MAKING A VISCOSITY INDEX IMPROVING COPOLYMER

The present invention relates to viscosity index improving additives for lubricating oils and, more particularly, to a method for making a copolymer of alkyl (meth)acrylate monomers and a vinyl aromatic monomer.

Lubricating oil compositions for internal combustion engines typically include polymeric additives for improving the viscosity index of the lubricating composition, that is, modifying the relationship between temperature and the viscosity of the oil composition to reduce the temperature dependence of the viscosity and to lower the "pour point" of the composition, that is, to allow the composition to remain fluid at reduced temperature.

Japanese Patent 84020715 (JP '715) discloses an oil soluble copolymer obtained by reaction of 40 weight percent (wt %) to 75 wt % (meth) acrylate monomers composed of 0 parts by weight (pbw) to 80 pbw of a (meth)acrylate having a ($C_8$–$C_{15}$)alkyl group and 20 pbw to 100 pbw of a (meth)acrylate having a ($C_{16}$–$C_{28}$)alkyl group; and 25 wt % to 60 wt % of styrene or an alkyl styrene.

While the properties of the copolymer disclosed in JP '715 are desirable, current environmental and health concerns dictate that the amount of residual styrenic monomer present in any commercial embodiment of the copolymer be reduced to a level below 1000 parts per million. JP '715 is silent with respect to the amount of residual styrene monomer present in the copolymers disclosed in that patent.

It is impractical to rely upon running the polymerization reaction to a sufficiently high monomer conversion so as to leave less than 1000 parts per million (ppm) nonreacted styrenic monomer in the copolymeric product, so that relatively costly processing steps as, e.g., stripping of the copolymeric product, may be required to remove residual styrenic monomer from the product copolymer.

A method for making a viscosity index improving copolymer of a (meth)acrylate monomer and a styrenic monomer that overcomes the above-noted difficulties is disclosed herein. The method includes:

polymerizing a monomer mixture in an oil soluble diluent and in the presence of a polymerization initiator to form a polymerization intermediate, said monomer mixture comprising:

from about 5 parts by weight (pbw) to about 70 pbw of a first (meth)acrylate monomer having the structural formula (1):

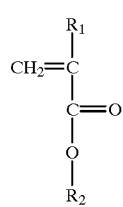

(1)

wherein:
each $R_1$ is independently H or $CH_3$; and
each $R_2$ is independently selected from ($C_{16}$–$C_{24}$)alkyl;
from about 5 pbw to about 85 pbw of a second (meth) acrylate monomer having the structural formula (2):

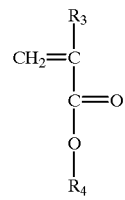

(2)

wherein:
each $R_3$ is independently H or $CH_3$; and
each $R_4$ is independently selected from ($C_7$–$C_{15}$)alkyl; and
from about 5 pbw to about 50 pbw of a styrenic monomer; and polymerizing from about 2 pbw to about 20 pbw additional (meth)acrylate monomer per 100 pbw of the combined first and second (meth)acrylate monomers of the monomer mixture, said additional (meth)acrylate monomer comprising a first (meth)acrylate monomer, a second (meth) acrylate monomer or a mixture thereof, in the presence of the polymerization intermediate, provided that the combined monomers of the monomer mixture and additional monomer comprise from about 5 wt % to about 70 wt % of the first (meth)acrylate monomer, from about 5 wt % to about 85 wt % of the second (meth)acrylate monomer and from about 5 wt % to about 50 wt % of the styrenic monomer, to provide a solution of from about 30 weight percent to about 90 weight percent of a viscosity index improving copolymer in the diluent, said solution including less than or equal to 1000 pbw residual styrene monomer per 1,000,000 pbw solution.

The limitation on the amount of residual styrenic monomer in the product solution may, alternatively, be expressed on the basis of copolymer solids as less than or equal to 3,333 pbw residual styrene monomer per 1,000,000 pbw copolymer solids. In a preferred embodiment, the method of the present invention provides a copolymer solution that includes less than or equal to 1,000 pbw, more preferably, less than or equal 500 pbw, residual styrene monomer per 1,000,000 pbw copolymer solids.

The terminology "(meth)acrylate" is used herein to generally refer to acrylate esters, methacrylate esters and mixtures thereof Commercially available alkyl (meth)acrylate monomers may be, and typically are, mixtures of esters. Such mixtures are typically referred to, and are referred to herein, using a contracted version of the names of the ester species predominating in the mixture, e.g., "lauryl-myristyl methacrylate", "cetyl-eicosyl methacrylate", "cetyl-stearyl methacrylate", "dodecyl-pentadecyl methacrylate".

As used herein, ($C_{16}$–$C_{24}$)alkyl means any straight or branched alkyl group having 16 to 24 carbon atoms per group, e.g., stearyl, cetyl, heptadecyl, nonadecyl, eicosyl.

Monomers having the structural formula (1) include, for example, stearyl acrylate, stearyl methacrylate, cetyl methacrylate, heptadecyl acrylate, heptadecyl methacrylate, nonadecyl methacrylate, eicosyl methacrylate and mixtures thereof, e.g., cetyl-stearyl methacrylate, cetyl-eicosyl methacrylate.

As used herein, ($C_7$–$C_{15}$)alkyl means any straight or branched alkyl group having 7 to 15 carbon atoms per group, e.g., heptyl, octyl, nonyl, n-decyl, isodecyl undecyl, lauryl, tridecyl and myristyl.

Monomers having the structural formula (2) include, for example, octyl acrylate octyl methacrylate, nonyl methacrylate, decyl acrylate, decyl methacrylate, isodecyl methacrylate, undecyl methacrylate, lauryl methacrylate, tridecyl methacrylate, myristyl methacrylate, pentadecyl methacrylate and mixtures thereof, e.g., lauryl-myristyl methacrylate.

The term "styrenic monomer" means those polymerizable vinyl aromatic compounds having a single aromatic ring per molecule and mixtures thereof and includes, for example, styrene, alkyl-substituted styrenes such as α-methyl styrene, α-ethyl styrene, p-methyl styrene and vinyl xylene, halogenated styrenes such as chlorostyrene, bromostyrene and dichlorostyrene and other vinyl aromatic compounds having a single aromatic ring per molecule and having one or more nonreactive substituents on the aromatic ring. In a preferred embodiment, the styrenic monomer is styrene.

The copolymer of the present invention is made, e.g., by free radical polymerization of selected relative amounts of the above-disclosed monomers in an oil soluble hydrocarbon diluent in the presence of an effective amount of a polymerization initiator.

In a preferred embodiment, the total monomer charge includes from about 20 wt % to about 50 wt %, more preferably, about 25 wt % to about 35 wt %, (meth)acrylate monomer of the structural formula (1), from about 20 wt % to about 50 wt %, more preferably, about 25 wt % to about 40 wt %, (meth)acrylate monomer of the structural formula (2) and form about 20 wt % to about 40 wt %, more preferably, about 25 wt % to about 35 wt %, of the styrenic monomer.

The diluent may be any inert oil soluble organic liquid and is preferably a hydrocarbon lubricating oil which is miscible with or identical to the lubricating oil base oil in which the additive is to be subsequently employed. In a preferred embodiment, the oil soluble diluent is a paraffinic or naphthenic neutral oil.

In a preferred embodiment, the reaction mixture includes from about 15 to about 400 pbw diluent per pbw total monomer charge and, more preferably, from about 50 to about 200 pbw diluent per 100 pbw total monomer charge. As used herein the terminology "total monomer charge" means all monomers charged to the reaction vessel during the process of the present invention, i.e., the combined monomers of the monomer mixture and the additional (meth)acrylate monomer.

Suitable polymerization initiators include those initiators which dissociate upon relatively mild heating, e.g., at temperatures in the range of 70° C. to 140° C., to yield a free radical. The specific reaction temperature to be used in the polymerization reaction is selected in a known way, based on the composition of the initiator used in the reaction. Suitable initiators are known in the art and include, e.g., peroxides, hydroperoxides and related initiators such as benzoyl peroxide, tert-butyl hydroperoxide, cumene peroxide, acetyl peroxide, caproyl peroxide, tert-butyl perbenzoate, tert-butyl diperphthalate, methyl ethyl ketone peroxide, azo initiators such as, e.g., azo diisobutyronitrile, azo diisobutyramide, azobis(a, a-dimethylvaleronitrile), azobis(a-methylbutyronitrile) and dimethyl, diethyl or dibutyl azobis(methylvalerate), and mixtures thereof. The peroxide initiators are preferably used at a level of from about 0.01% to 3% by weight, based on the total weight of the monomers, and the azo initiators are preferably used at a level from about 0.01% to about 2% by weight, based on the total monomer charge.

In a preferred embodiment, the reaction mixture includes from about 0.05 pbw to about 2.0 pbw polymerization initiator per 100 pbw total monomers and, more preferably, from about 0.1 pbw to about 1.0 pbw polymerization initiator per 100 pbw total monomer charge.

The reaction mixture may, optionally, include a chain transfer agent. Suitable chain transfer agents include those conventional in the art, e.g., dodecyl mercaptan, ethyl mercaptan. Dodecyl mercaptan is preferred as the chain transfer agent. The selection of the amount of chain transfer agent to be used is based on the desired molecular weight of the polymer being synthesized in a manner conventional in the art. In a preferred embodiment, the reaction mixture includes from about 0.01 pbw to about 0.6 pbw chain transfer agent per 100 pbw total monomer charge, and more preferably includes from about 0.01 pbw to about 0.3 pbw chain transfer agent per 100 pbw total monomer charge.

The diluent, an effective amount of a first polymerization initiator, the styrenic monomer and a portion of the (meth)acrylate monomers are charged to a reaction vessel and heated with stirring, preferably under an inert, e.g., nitrogen, blanket to a temperature within a first reaction temperature range. A first reaction temperature range is selected based on the composition of the first initiator. The batch is then maintained at a temperature within the first reaction temperature range, with stirring, for a time period effective to allow copolymerization of the monomers in the reaction mixture, e.g., for about 2 hours to about 12 hours.

In a preferred embodiment, a portion, e.g., from about 25% to about 60%, of the monomer mixture is initially charged to the reaction vessel and heated in the diluent in the presence of the polymerization initiator to a temperature within the first reaction temperature range. The remaining portion of the monomer mixture is then fed into the reaction vessel with stirring and while maintaining the batch at a temperature within the first reaction temperature range over a time period of about 30 minutes to about 180 minutes. Following completion of the monomer mixture addition, the batch is maintained at a temperature within the first reaction temperature range for a holding period of up to about 4 hours.

A second portion of (meth)acrylate monomer and an second amount of initiator compound is then charged to the reactor. In a preferred embodiment, the second portion of (meth)acrylate monomer comprises about 2 pbw to about 20 pbw (meth)acrylate monomer per 100 pbw of the combined first and second (meth)acrylate monomers of the monomer mixture. More preferably, the second portion of (meth)acrylate monomer comprises about 5 pbw to about 10 pbw (meth)acrylate monomer per 100 pbw of the combined first and second (meth)acrylate monomer of the monomer mixture.

In a highly preferred embodiment, the second portion of the (meth)acrylate monomer consists essentially of either the first (meth)acrylate monomer i.e., the $(C_{16}-C_{24})$alkyl (meth)acrylate monomer, or the second (meth)acrylate monomer, i.e., the $(C_7-C_{15})$alkyl (meth)acrylate monomer.

In a very highly preferred embodiment, the second portion of the (meth)acrylate monomer consists essentially of the second (meth)acrylate monomer, i.e., the $(C_7-C_{15})$alkyl (meth)acrylate monomer, The composition of the second amount of initiator may differ from the initiator present in the initial reaction mixture. A second reaction temperature range is selected based on the composition of the second amount of initiator.

Following completion of the addition of the second portion of (meth)acrylate monomer and second portion of initiator, the batch is maintained at a temperature within the second reaction temperature range for a second holding period of up to about 4 hours.

In a preferred embodiment, a third portion of initiator of about 0.05 pbw to about 1.0 pbw polymerization initiator per 100 pbw total monomer charge is added to the reaction mixture subsequent to the second holding period. A third reaction temperature range is selected based on the composition of the third amount of initiator.

The reaction mixture is held within a third reaction temperature range for a time period of about 30 minutes to about 180 minutes subsequent to the addition of the third portion of polymerization initiator to complete the polymerization reaction.

A viscous solution of the copolymer in the diluent, wherein the copolymer has substantially the same relative composition as the above described total monomer charge and the solution includes less than 1000 ppm, preferably less than 500 ppm and most preferably less than 300 ppm, residual styrenic monomer is obtained as the product of the polymerization process. The polymer solids content of the solution is selected and may, optionally, be further adjusted, i.e., by further dilution, on the basis of the viscosity of the copolymer to provide a to provide a tractable fluid.

In a preferred embodiment, the copolymer of the present invention exhibits a weight average molecular weight, determined, e.g., by gel permeation chromatography, from about 20,000 to about 500,000, more preferably, from about 150,000 to about 400,000.

In a preferred embodiment, the copolymer of the present invention exhibits a polydispersity factor, i.e., the ratio of the number average molecular weight of the copolymer to weight average molecular weight of the copolymer, of about 1.5 to about 10, more preferably, from about 1.5 to about 5.

The copolymer of the present invention may, optionally, be synthesized at a molecular weight that is higher than desired for the intended end use and then be mechanically or thermally degraded to adjust the molecular weight of the copolymer into the desired range, in a manner known in the art.

The polymer solution formed in the process of the present invention is useful as an additive compostion for improving the viscosity of a lubricating oil and includes from about 30 weight percent to about 90 weight percent, more preferably from about 40 weight percent to about 80 weight percent, polymer solids dissolved in an oil soluble diluent.

The copolymer made by the process of the present invention is is added, typically in the form of the above-diclosed additive composition, to a lubricating oil base stock, e.g., a paraffinic solvent neutral oil, to provide a lubricating oil composition having the desired viscometric properties. Suitable lubricating oil base stocks include paraffinic and naphthenic neutral oils.

A lubricating oil composition of the present invention includes from about 2 pbw to about 20 pbw, more preferably from about 5 pbw to about 15 pbw, of the copolymer (on the basis of polymer solids) per 100 pbw lubricating oil base stock.

EXAMPLE 1

A copolymer was made by the process of the present invention.

A styrenic monomer (styrene (165 g)) and a polymerization initiator (74% benzoyl peroxide (0.95 g)) were mixed in a closed vessel at room temperature to form a homogeneous solution of the initiator in the styrenic monomer. A first alkyl methacrylate monomer (isodecyl methacrylate (112.5 g)), a second alkyl methacrylate monomer (stearyl methacrylate (192.5 g)), a polymerization initiator (t-butyl perbenzoate (0.10 g)) and a chain transfer agent (n-dodecyl mercaptan (0.39 g)) were then added to the solution and stirred for 10 minutes to form a "monomer mixture".

A 1 liter reaction vessel was fitted with a thermometer, a temperature controller, a purge gas inlet, a water-cooled reflux condenser with purge gas outlet, a stirrer, and an addition funnel. A portion of the monomer mixture (120 g) and a diluent (a grade 90, solvent neutral mineral oil having a bromine index less than 12 (50 g)) were charged to the reaction vessel. The contents of the reaction vessel were then heated to 120° C. over a time period of 30 minutes with stirring and with a nitrogen sparge of 50 cubic cm per minute.

When the reactor contents reached 120° C., the remaining monomer mixture was fed to the kettle at a substantially constant rate over a time period of about 2.5 hours. At the end of the monomer feed, the reactive mixture was maintained at 120° C. for a time period of 30 minutes and then an additional amount of polymerization initiator (t-butyl peroctoate (0.75 g)) and an additional amount of diluent (a grade 90, solvent neutral mineral oil having a bromine index less than 20 (58 g)) were quickly added to the reaction vessel. The contents of the reaction vessel were then maintained at 120° C. for a first holding time period of 30 minutes.

Following the first holding time period, an additional amount of the first alkyl methacrylate monomer (isodecyl methacrylate (25 g)) and an additional amount of polymerization initiator (t-butyl peroctoate (0.75 g)) were charged to the reaction vessel. The contents of the reaction vessel were then maintained at 120° C. for a second holding time period of 30 minutes.

Following the 30 minute second holding time period, an additional amount of polymerization initiator (t-butyl peroctoate (0.75 g)) and an additional amount of diluent (a grade 90, solvent neutral mineral oil having a bromine index less than 20 (58 g)) were charged to the reaction vessel. The contents of the reaction vessel were then heated from 120° C. to 130° C. over a time period of 30 minutes, then maintained at 130° C. for a time period of 30 minutes and finally allowed to cool to ambient temperature.

The above described process produced a viscous solution of a copolymer in the diluent. The solution was further diluted with additional diluent (a grade 90, solvent neutral mineral oil having a bromine index less than 20 (324 g)). The copolymer solution of Example 1 exhibited a polymer solids content of 73 wt % and a viscosity of 22,239 centiStokes (cSt) at 100° C. measured according to ASTM D445-88. Conversion of monomer to copolymer was calculated to be 98%. The product solution included 170 pbw nonreacted styrene monomer per one million pbw solution (227 pbw nonreacted styrene monomer per one million pbw copolymer), as determined by headspace gas chromatography.

EXAMPLE 2

The copolymer solution of Example 2 was made by the method of Example 1, using the same relative amounts of the respective monomers. The copolymer solution of Example 1 exhibited a polymer solids content of 74 wt % and a viscosity of 25,300 cSt at 100° C. measured according to ASTM D445-88. Conversion of monomer to copolymer was calculated to be 99%. The product solution included 80 pbw nonreacted styrene monomer per one million pbw solution (160 pbw nonreacted styrene monomer per one million pbw copolymer), as determined by headspace gas chromatography.

The copolymer of the solution of Example 2 exhibited a weight average molecular weight of 240,000, measured by gel permeation chromatography using a polystryrene calibration standard, and a polydispersity of 4.5.

EXAMPLE 3

The concentrated copolymer solution of Example 2 was diluted with 150 neutral oil (viscosity index of 92, pour point of −9° C.) to provide the lubricating oil composition of Example 3.

The lubricating oil composition of Example 3 included 8.7 wt % copolymer solids and exhibited a kinematic viscosity of 13.94 cSt at 100° C., measured according to ASTM D44-588. The lubricating oil composition exhibited a kinematic viscosity of 85.67 cSt at 40° C., measured according to ASTM D44-588, and a viscosity index of 168.

The lubricating oil composition exhibited a sonic shear index (SSI) of 28 and viscosity loss of 17.4%, determined according to Comite Europeen de Coordination (CEC) L 14 A 88 (30 cycles).

The lubricating oil composition exhibited a pour point of −39° C., measured according to ASTM D97-87.

The process of the present invention provides viscosity index improving and pour point lowering copolymeric additive for lubricating oils that is derived from alkyl (meth) acrylate monomers and a styrenic monomer and that includes less than or equal to about 1000 ppm residual styrenic monomer. The process of the present invention provides an oil additive solution that includes a copolymer having repeating units derived from a styrenic monomer but that exhibits a very low residual styrenic monomer content and avoids such costly process steps as, e.g., stripping of the copolymeric product to remove unreacted styrenic monomer.

I claim:

1. A method for making a viscosity index improving copolymer solution, comprising:
    polymerizing a monomer mixture in an oil soluble diluent and in the presence of a polymerization initiator to form a polymerization intermediate, said monomer mixture comprising:
        from about 5 parts by weight to about 70 parts by weight of a first (meth)acrylate monomer having the structural formula:

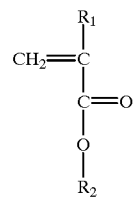

wherein:
    each $R_1$ is independently H or $CH_3$; and
    each $R_2$ is independently selected from $(C_{16}-C_{24})$alkyl;
from about 5 parts by weight to about 85 parts by weight of a second (meth)acrylate monomer having the structural formula:

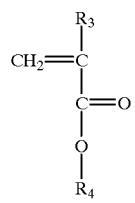

wherein:
    each $R_3$ is independently H or $CH_3$; and
    each $R_4$ is independently selected from $(C_7-C_{15})$alkyl; and
from about 5 parts by weight to about 50 parts by weight of a styrenic monomer; and
polymerizing from about 2 parts by weight to about 20 parts by weight additional (meth)acrylate monomer per 100 parts by weight of the combined first and second (meth)acrylate monomers of the monomer mixture, said additional (meth)acrylate monomer consisting essentially of the first (meth)acrylate monomer, the second (meth)acrylate monomer or a mixture thereof, in the presence of the polymerization intermediate, provided that the combined monomers of the monomer mixture and the additional monomer comprise from about 5 weight percent to about 70 weight percent of the first (meth)acrylate monomer, from about 5 weight percent to about 85 weight percent of the second (meth)acrylate monomer and from about 5 weight percent to about 50 weight percent of the styrenic monomer, to provide a solution of from about 30 weight percent to about 90 weight percent of a viscosity index improving copolymer in the diluent, said solution including less than or equal to 1000 parts by weight residual styrene monomer per one million parts by weight solution.

2. The method of claim 1, wherein the first (meth)acrylate monomer is selected from the group consisting of stearyl methacrylate, cetyl methacrylate, heptadecyl methacrylate, nonadecyl methacrylate, eicosyl methacrylate and mixtures thereof.

3. The method of claim 1, wherein the second (meth) acrylate monomer is selected from the group consisting of heptyl methacrylate, octyl methacrylate, nonyl methacrylate, n-decyl methacrylate, isodecyl methacrylate, undecyl methacrylate, lauryl methacrylate, tridecyl methacrylate, myristyl methacrylate, pentadecyl methacrylate and mixtures thereof.

4. The method of claim 1, wherein the styrenic monomer is selected from the group consisting of styrene, alkyl-substituted styrenes and halogenated styrenes.

5. The method of claim 1, comprising polymerizing from about 2 parts by weight to about 10 parts by weight additional (meth)acrylate monomer per 100 parts by weight of the combined first and second (meth)acrylate monomers of the monomer mixture.

* * * * *

UNITED STATES PATENT AND TRADEMARK OFFICE
CERTIFICATE OF CORRECTION

PATENT NO. : 6,228,819 B1
DATED : May 8, 2001
INVENTOR(S) : Schauber

It is certified that error appears in the above-identified patent and that said Letters Patent is hereby corrected as shown below:

<u>Title page,</u>
Item [75], the Inventor's name is incorrect. Item [75], should read as follows:

[75] Inventor: Claude Charles Schauber, Riedseltz (FR)

Signed and Sealed this

Fifth Day of February, 2002

Attest:

JAMES E. ROGAN
*Director of the United States Patent and Trademark Office*

*Attesting Officer*